Sept. 23, 1930.   C. F. WHITEHOUSE   1,776,484
CONDUIT FOR ELECTRIC CONDUCTORS
Filed Oct. 22, 1928
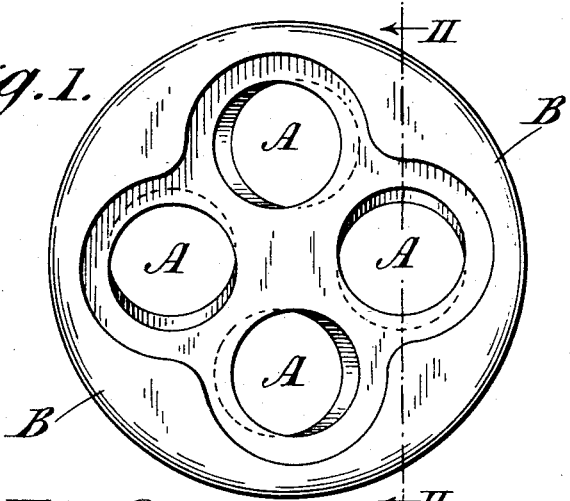
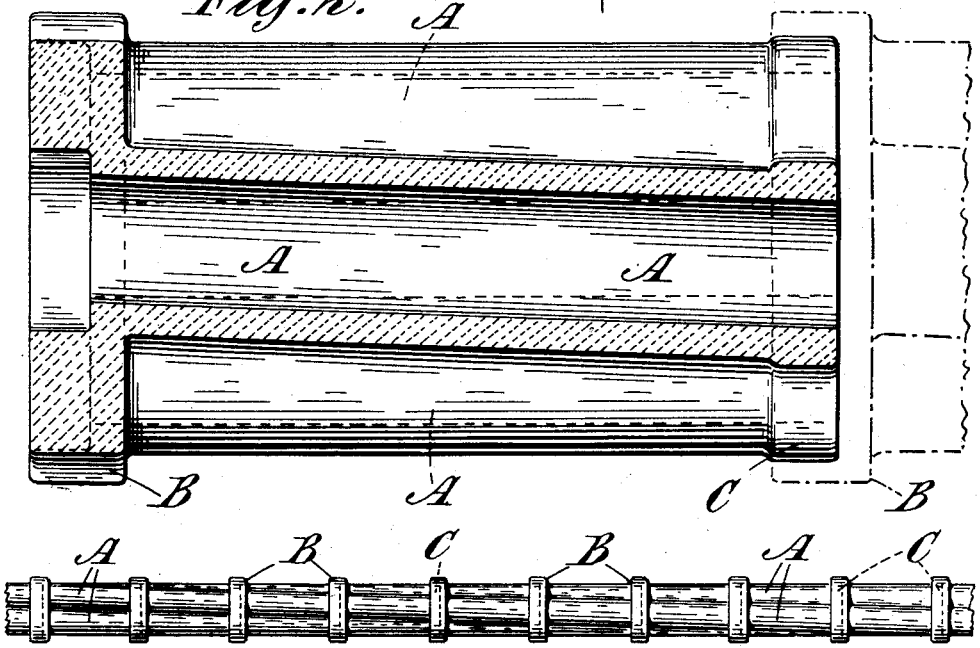

Patented Sept. 23, 1930

1,776,484

UNITED STATES PATENT OFFICE

CHARLES FREDERIC WHITEHOUSE, OF LEEDS, ENGLAND

CONDUIT FOR ELECTRIC CONDUCTORS

Application filed October 22, 1928, Serial No. 314,227, and in Great Britain October 24, 1927.

This invention relates to multi-way conduits for electric conductors, and has for its object to provide an improved form of such conduit.

According to this invention, instead of the individual conduits or ways extending parallel to the axis of the conduit, each individual conduit or way revolves round the central axis of the composite conduit. Thus each individual conduit or way follows a helical path, the pitch of the helix being predetermined so that each way revolves round the central axis a predetermined number of times in a given length.

The actual number of ways or conduits may vary, but preferably the external shape of the conduit is such as to enable similar lengths of conduit to be assembled and easily laid in a trench and for this purpose the socket end of each section or length is conveniently circular in plan and of greater diameter than the main portion so that, when assembled, the line of sections rests upon the enlarged socket portions.

One construction of multi-way conduit according to this invention is illustrated by way of example in the accompanying drawings, in which Figure 1 is an end elevation of a single length or section, Figure 2 is a section thereon on the line II—II of Figure 1, and Figure 3 shows in side elevation on a reduced scale a series of nine lengths connected together illustrating the helical course of the individual ways.

In practice where there is, say, a 6° deviation in each two-foot length of conduit each individual way will make a complete turn in sixty lengths or one turn in one hundred and twenty feet, in the case of a 4½° deviation a complete turn taking place in each one hundred and sixty feet or eighty lengths. The construction illustrated in Figure 1 is provided with four individual ways A which are not formed parallel to one another as is usual, each individual conduit or way revolving round the central axis of the composite conduit so as to follow a helical path. Each section may be formed of earthenware or other suitable material and one end is furnished with an enlarged flange B of cylindrical shape provided with recesses or sockets to receive and register with the spigot end C of the next adjacent conduit. All the lengths can be cast in a single mould as each length is exactly similar and adjacent lengths are turned so that the spigot end C of one registers with the socket B of the next, the cylindrical or circular socket of each length as will be seen, being of enlarged diameter so that the sockets form a series of projecting supports of constant external shape and diameter despite the pitch or "lay" of the individual conduits.

Obviously the pitch of the helix or "lay" of the individual conduits may vary so long as the conductors can easily be drawn through the conduits after the latter have been laid and the lengths of conduit can easily be cast or otherwise formed without difficulty, a convenient degree of variation in each two-foot length being either 4½° or 6° above mentioned.

With a conduit furnished with helical ways according to this invention the electric conductors are automatically wormed together. Further, conductors drawn through conduits having helical ways according to this invention possess the further advantage over similar cables when laid in conduits parallel to the cable axis in that they will have less interference with adjacent telephone, telegraph or other cables.

It will be appreciated that although exactly similar unit lengths are preferably employed this is not absolutely necessary and that alternative means for connecting adjacent conduits together may be adopted instead of the socket arrangement illustrated and described without departing from this invention.

What I claim as my invention and desire to secure by Letters Patent is:—

1. A conduit for electric conductors built up from a series of similar sections each having a plurality of individual ways, each of said ways revolving round the central axis of the composite conduit so as to follow a helical path of predetermined pitch throughout the length of the conduit.

2. A multi-way conduit for electric conductors comprising a series of similar sections each having a plurality of individual ways constructed to follow a helical path and a socket at one end of each section adapted to receive a spigot at one end of the adjacent section, the socket being circular in plan and of greater diameter than the main portion of the section for the purpose specified.

In testimony whereof I have signed my name to this specification.

CHARLES FREDERIC WHITEHOUSE.